Patented Oct. 16, 1923.

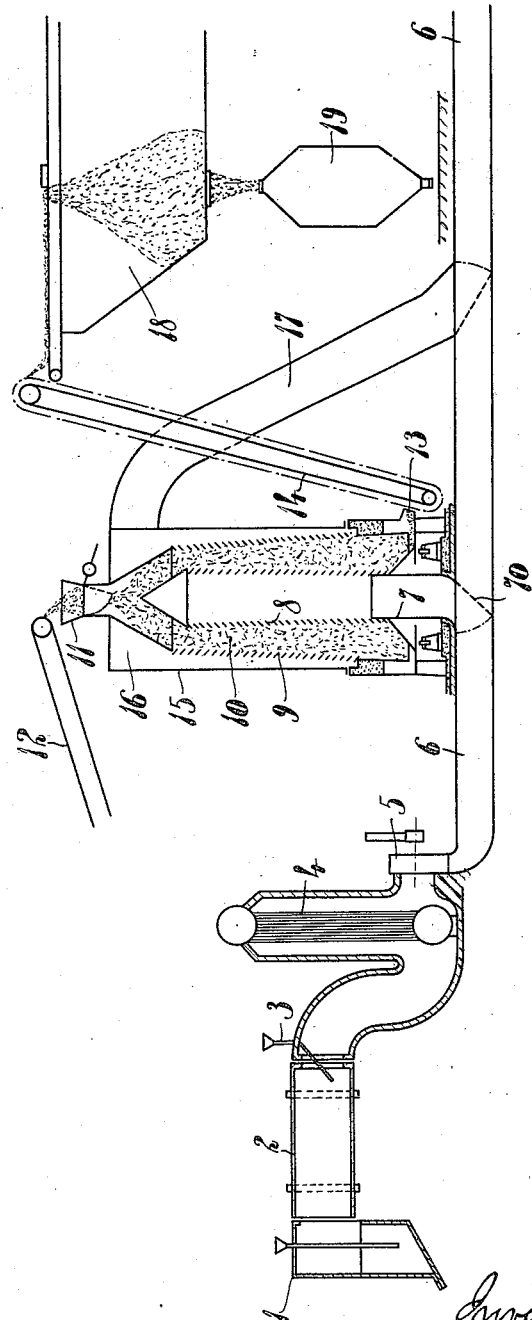

1,471,276

UNITED STATES PATENT OFFICE.

OTTO NORDSTROM, OF SUNDSVALL, SWEDEN.

RECOVERING VALUABLE PRODUCTS FROM GASES.

Application filed July 7, 1922. Serial No. 573,449.

*To all whom it may concern:*

Be it known that I, OTTO NORDSTRÖM, a citizen of the Kingdom of Sweden, residing at Sundsvall, Sweden, have invented new and useful Improved Method of Recovering Valuable Products from Gases, for which I have filed application for patent in Sweden, dated Aug. 6, 1921, and of which the following is a specification.

In certain industries valuable products are carried away by the exhaust or waste gases in which they are suspended as a dust or smoke. Several proposals have been made to recover such products. In other industries, however, it is desirable to free the gases from detrimental or destructive constituents before the gases may be used in the production or may be allowed to escape into the atmosphere.

This invention relates to a method of continuously separating dusty or liquid products from gases. The method may also be applied to the separation of gaseous products from gases in case the former are sublimating. According to this invention the separation is effected in a filtering shaft by continuously passing through said shaft the gases to be treated and a filtering material of a nature that enables the same to be used as the raw material of a production together with the substances recovered from the gases, without the necessity of separating said substances from the filtering material.

The invention, while being applicable for recovering valuable products from gases in general, is especially adapted for recovering the valuable chemicals that accompany the waste gases from the soda furnaces of sulphate cellulose mills. In such case the method may be combined with drying of the wood chips for the boiling process by using the wet wood chips as filtering material and by using as filtering shaft a drying tower which for the sake of obtaining a continuous working and a large output is provided with continuously operating filling and emptying means for the material to be dried as well as with means for effectively distributing the gases through the wood chips.

In the drawing, I have shown by way of example a diagrammatic view of a plant for effecting such combined gas filtrating and wood drying process.

With reference to the drawing the numeral 1 designates a stationary soda furnace and 2 is a rotary soda furnace having a black or waste lye inlet 3. The outlet end of the furnace 2 is connected to a heat exchange apparatus 4, as for instance, a steam boiler the waste gas outlet of which contains a fan-blower 5 for draught production. Extending from the pressure side of said fan-blower to a chimney (not shown) is a channel 6. A branch channel 7 controlled by a damper 70 projects upwardly from the channel 6 and extends a certain distance up into the interior of a shaft shaped drying apparatus, comprising a central perforated wall 8 to the lower end of which the passage 7 is connected, and an outer likewise perforated wall 9 forming between it and the wall 8 an annular space or chamber 10 tapering upwardly and surmounted by a hopper 11. Arranged above said hopper with its delivery end is a continuously operating conveyer 12 for the filtering material. The chamber 10 communicates at its lower end with a continuously operating emptying device (as, for instance, a rotary scraper, not shown) serving to feed out the filtering material through an aperture 13. For receiving the filtering material and passing same away provision is made of an elevator 14. The drying tower is surrounded by a tight wall 15 forming a gas collecting chamber 16 around the tower. From said chamber a pipe 17 extends to the channel 6. The elevator 14 has its delivery end situated above a chips' bin 18 and the latter is in turn situated above a sulphate cellulose boiler 19 in the well known way.

The operation of the plant described above is as follows: In the soda furnaces 1 and 2 the black or waste lye from a preceding boiling process is vaporized and the organic constituents of the lye are burned to recover the chemicals. The waste gases escaping from the furnace 2 at high temperature are utilized for producing steam in the steam boiler 4 and are then pressed by means of the fan-blower 5 into the channel 6. Said gases carry with them a great percentage of the chemicals that were contained in the black lye. Said chemicals are now in the shape of dust or sublimating products. The gases which still have a comparatively high temperature ascend through the branch passage 7 and into the interior of the inner wall 8 of the drying tower, and will then pass through the apertures of said wall and into the chamber 10. Said chamber is filled with wet wood chips continuously fed in by means of the conveyor 12 and continuously removed through the aperture 13 and passed away by the elevator 14. The gases when passing through the wood chips in the chamber 10 will absorb moisture therefrom and will pass through the apertures of the wall 9 and into the gas collecting chamber 15 from which they are led by the pipe 17 to the channel 6 to escape into the atmosphere by way of the chimney, not shown. During the passage of the gases through the chips of wood there is not only effected a drying of the chips by the hot gases, but the chips of wood will at the same time take up the dusty products accompanying the gases, as well as the sublimating substances precipitating on the chips owing to the fall in the tempreature within the drying shaft. The chemicals will thus accompany the wood chips on their way to the bin 18 and to the boiler 19 where the chemicals are utilized in the boiling process.

What I claim is:—

A method of filtering waste gases from soda furnaces of sulphate cellulose mills which consists in passing said gases and chips of wood through a filtering shaft so as to cause the hot gases to dry said chips of wood, which will in turn remove dusty and sublimating products from the gases, and then passing said chips of wood together with the products absorbed thereby to a sulphate cellulose boiler without first seperating said products from said chips of wood.

In testimony whereof I have signed my name.

OTTO NORDSTRÖM.